Oct. 24, 1933.　　　　E. DIETZE　　　1,932,101
SELF LOCKING SEAL
Filed March 16, 1933
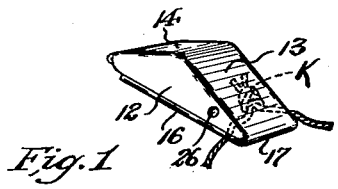
Fig.1
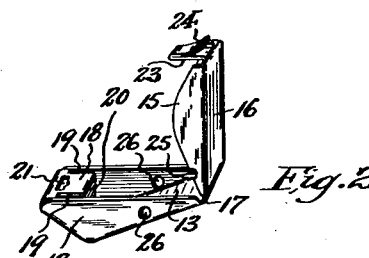
Fig.2
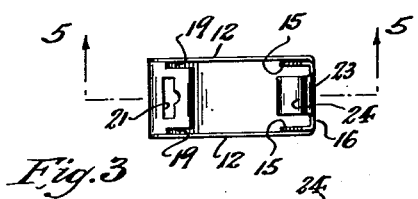
Fig.3　Fig.4
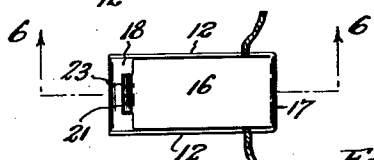
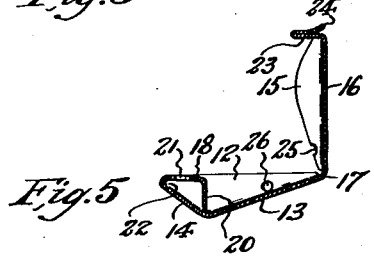
Fig.5
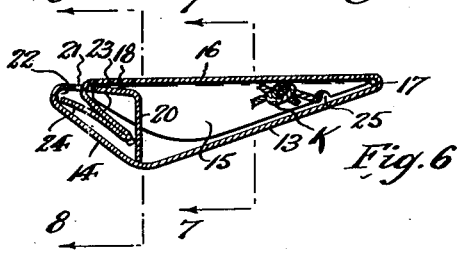
Fig.6
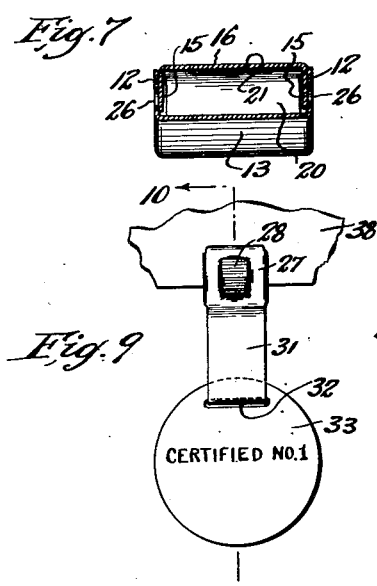
Fig.7　Fig.9
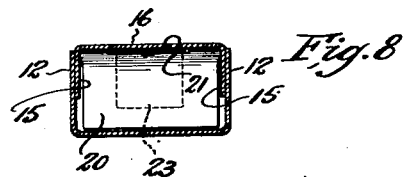
Fig.8
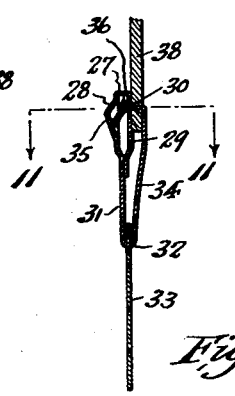
Fig.10
Fig.11
INVENTOR
Emil Dietze,
BY
George D. Richards
ATTORNEY

Patented Oct. 24, 1933

1,932,101

UNITED STATES PATENT OFFICE 1,932,101

SELF-LOCKING SEAL

Emil Dietze, Richmond Hill, N. Y., assignor to American Casting & Manufacturing Corporation, Brooklyn, N. Y., a corporation of New York Application March 16, 1933. Serial No. 661,040

10 Claims. (Cl. 292—325)

This invention relates to improvements in self-locking seals; and the invention has reference, more particularly, to a novel initially open seal having cooperative parts adapted to automatically interlock to hold the seal closed in connection with the article to be protected thereby.

This invention has for its principal object to provide, as a unitary structure, a seal device having initially separated or open sections provided with cooperative locking elements interengageable by closing together said open sections to lock the seal relative to the article to be protected thereby, said locking elements, when interengaged, being proof against release without such destruction or mutilation as will indicate tampering therewith.

Another object of this invention is to provide, in combination with cooperating male and female lock elements, a means for deflecting or bending the male element, when entered into the female element, whereby the former is snubbed around a portion of the latter to thereby interlock the cover and body sections of the seal against even partial separation.

Other objects of this invention, not at this time more particularly enumerated, will be understood from the following detailed description of this invention.

Illustrative embodiments of this invention are shown in the accompanying drawing, in which:—

Fig. 1 is a perspective view of one form of seal according to this invention, the same being shown in its locked condition; Fig. 2 is a perspective view of this form of seal shown in its initially open condition; Fig. 3 is a top plan view of the seal open; Fig. 4 is a top plan view of the seal closed; Fig. 5 is a vertical longitudinal section taken on line 5—5 in Fig. 3; Fig. 6 is a vertical longitudinal section, taken on line 6—6 in Fig. 4, but drawn on an enlarged scale; Fig. 7 is a transverse section, taken on line 7—7 in Fig. 6; and Fig. 8 is a transverse section, taken on line 8—8 in Fig. 6.

Fig. 9 is a face view of another form of seal according to this invention; Fig. 10 is a longitudinal section, taken on line 10—10 in Fig. 9; and Fig. 11 is a transverse section, taken on line 11—11 in Fig. 9, but drawn over an enlarged scale.

Similar characters of reference are employed in the above described views, to indicate corresponding parts.

Referring first to Figs. 1 to 8 inclusive of the drawing, there is shown therein one form of seal according to this invention of the hollow box type, which is especially adapted to receive and inaccessibly enclose the knotted end of a tie-cord, the joined ends of other material, and the like. The seal in this form is provided with a hollow body section comprising longitudinal side walls 12 and an angular bottom wall formed by a rear wall portion 13 and an oblique forward wall portion 14, the latter being inclined downwardly and rearwardly from the forward end of the body section to converge upon said rear wall portion 13. Said hollow body section is formed by drawing with suitable tools a portion of the blank, from which the seal structure is made, into the desired hollow formation above described.

Integrally connected with the rear end of said hollow body section is a cover section comprising longitudinal side walls 15 of suitable shape and a top wall 16, the latter being integrally joined end to end with the rear wall portion 13 of the body section so as to form a bendable hinge portion 17.

Integrally connected with the forward end of said hollow body section is a female lock element comprising a plate 18 doubled back over the open top of the body section so as to overlie and to be spaced above the oblique forward bottom wall portion 14 of the latter. The sides of said plate 18 are cut back to provide longitudinal entrance ways 19 intermediate the side margins of the plate 18 and the adjacent side walls 12 of said body section, which entrance ways give access to the side walls 15 of the cover section of the seal when the latter is operatively closed over said body section. Integrally formed in connection with the free end of said plate 18 is a downwardly turned substantially vertical section 20 which foots upon the bottom of the body section and serves as an abutment for the male lock element to be later described as well as a supporting strut for said plate 18. Said plate 18 is provided intermediate its ends with a transverse slot 21. The disposition of the plate 18 relative to the oblique forward bottom wall portion 14 of the body section, is such that these parts converge one upon the other at the forward end of the body section, thus providing within the latter a lock seat 22 at the juncture of these parts and forwardly of the slot 21.

Integrally connected with the free end of the top wall 16 of said cover section is a male lock element. This male lock-element comprises a tongue 23 of less width than said cover section op plate, the former being bent inwardly to initially lie substantially at right angles to the latter. The free end portion of said tongue 23 is outwardly doubled back upon itself to provide a spur portion 24 having its free end bent in somewhat off-set relation to the plane of said tongue 23.

If desired, the margins of the cover section sides 15 may be indented or notched as at 25 to receive the branches of the knotted tie cord to be enclosed in the seal interior.

To apply the seal in use, as e. g. over the knotted end K of a tie cord or the like, the latter is laid within the interior of the body section, whereupon the open cover section is bent down into closed relation to said body section, the branches of the tie cord emerging outwardly of the closed seal body between the respectively adjacent side walls of the body and cover sections, and preferably engaged in the notches 25 of the cover section side walls 15. The cover section is somewhat narrower than the body section, so that when closed down upon the latter its side walls will telescope within the body section side walls to lie contiguous thereto. As the cover section is bent down over and into closed relation to the body section, the tongue 23 with its spur portion 24, constituting the male locking element, enters the slot 21 of the plate 18 which constitutes the female lock element. As the tongue 23 passes downwardly through said slot 21, its free end strikes the downwardly and rearly inclined forward bottom wall section 14 of the body section so that, as it is pushed against the same, it is rearwardly deflected or bent. This effect of such rearward deflection of the tongue 23 is to double or snub the same, at its point of puncture with the wall 16 of the cover section, rearwardly around the margin of the slot 21, thus hooking the same about a portion of the plate 18 whereby the cover section is so interlocked to the body section as to resist even partial separation therefrom, which, if permitted, might enable the knotted end K of the tie-cord to be slipped out from between the partially separated cover and body sections. Such bending or deflection of the tongue 23 turns its end toward the vertical section 20 of the female lock element, as shown in Fig. 6, while also serving to throw forward the spur portion 24, as it passes downwardly beyond the slot 21, thus projecting the same forwardly in opposition to the internal lock seat 22 at the forward end of the body section. In this manner the cover section is non-separably locked in closed relation to the body section in such manner that the same cannot be released without so mutilating or destroying the seal structure as to at once give evidence that it has been tampered with. Should it be attempted to pry up and open the cover section, the forwardly projected spur portion 24 of the tongue 23 will be thrust into stopped engagement with the lock-seat 22, while the end of the tongue 23 will be caused to abut the vertical section 20 of the female element, thus maintaining the hooked bend 23' against straightening out or yielding, and thus effectively resisting any separating or opening movement of the cover section relative to the body section, and consequently rendering it impossible to gain access to the knotted tie cord end K enclosed within the interior of the seal, or to withdraw said knotted cord end from between the body and cover.

When the seal is locked, in the manner above described, some attempt might be made to gain control of the knotted tie cord end K by prying or spreading apart adjacent side walls of the body section and cover section sufficiently to crush inward the cover section side to permit the knot to be withdrawn sideways from the seal, so that the knot can be untied and the tie cord released from the protected article, and then later restored to tied condition, the knot being again retied and slipped back into the interior of the seal, and then the side wall of the body section flattened back to initial shape. It is doubtful, even if this were done, that some indication of the tampering would be avoided; however, to make certain that visible indication of such attempt would be clearly apparent, means are provided for quickly and easily detecting such occurrence. This means comprises one or more openings 26 formed in each exterior side wall 12 of the body section, through which the normally contiguous side walls 15 of the closed cover section would be normally visible. If an attempt to violate the seal in the manner described occurred, the crushed inner side wall of the cover section would be removed from normal closely contiguous underlying relation to the body section side wall and would not be possible of restoration to such normal condition. Consequently, even though the body section side wall were straightened or restored sufficiently to escape detection of its temporarily deformed condition, the inner cover section side wall could not be so restored, and would not be visible through the openings 26 so that the attempted tampering with the seal would be plainly indicated.

Referring now to Figs. 9 to 11 inclusive, there is shown therein a modified form of seal, still embodying however the general principles of this invention. This modified form of seal is especially adapted to attach certifying indicia to sheet or like materials. In one form, this modified type of seal comprises a unitary structure having a main body section 27 having a depressed oblique wall portion 28. Integrally connected with one end of said body section 27 is a plate 29 bent to overlie said body section and having a slot 30 therein spaced in opposition to said oblique wall portion 28. Integrally connected with the opposite end of said body section 27 is an extension 31 doubled back upon itself to provide a suspension loop 32 to receive and support desired certifying indicia 33. The doubled back end portion 34 of said extension 31 is provided at its free end with a lock tongue 35 angularly and inwardly extending therefrom. Struck from the body of said lock tongue 35 is a spur portion 36. Preferably said lock tongue is provided with a sharp pointed terminal end 37.

In the use of the seal in this modified form, the end portion 34 of the loop extension 31 is initially separated from the body section 27, whereby these parts straddle material 38 to which the seal is to be applied. The lock tongue 35 is pierced through the material 38, and thereupon entered through the slot 30 of the body section. As the tongue 35 passes into the body section, its free end strikes the oblique wall portion 28 so that, as it is pushed against the same, it is deflected or bent so as to be snubbed around a portion of the female element in unmovable holding relation thereto, and whereby the spur portion 36 is thrust or projected therefrom in opposition to the adjacent interior end of the body section, so as to brace the lock tongue against displacement from its snubbed relation to the female element and thus against outward withdrawal through the slot 30, and consequently the seal parts are securely locked against unauthorized detachment from the material 38.

It will be obvious that many changes could be made and many apparently widely different embodiments of this invention could be produced without departing from the scope thereof as defined in the claims appended hereto; consequently it is intended that all matter contained in the above description or shown in the accompanying drawing shall be interpreted as illustrative and not in a limiting sense.

I claim:——

1. A seal of unitary form comprising a body section having a depressed bottom including an inclined wall portion, a plate having a transverse slot adapted to fold over said body section above said inclined wall portion, a section bendable relative to said body section and having a lock tongue engageable through said slot, and said lock tongue having a spur portion, said lock tongue being adapted to be deflected by engagement with said inclined wall portion into hooked relation to said plate with said spur portion disposed to brace said lock tongue against displacement from such hooked relation and withdrawal from said slot.

2. A seal of unitary form comprising a body section and a cover section bendable into closed relation thereto, a slotted lock plate folded over one end of said body section, said body section having an inclined wall beneath said slotted lock plate, and said cover section having a lock tongue provided with a spur portion, said lock tongue being adapted to be deflected after passing through said slotted lock plate by engagement with said inclined wall to thereby dispose said lock tongue in hooked relation to said lock plate with said spur portion disposed to brace said lock tongue against displacement from such relation.

3. A seal of unitary form comprising a hollow body section and a cover section bendable into closed relation thereto, a slotted lock plate folded over one end of said body section, and said cover section having a lock tongue at its free end, said lock tongue having a spur portion to prevent withdrawal of said lock tongue from said slotted lock plate after entrance therethrough.

4. A seal of unitary form comprising a body section having side walls and a depressed bottom portion including an angular wall portion inclining from the forward end of said body, a slotted lock plate folded over said body from the forward end thereof and spaced above said angular wall section, a cover section having side walls to telescopically cooperate with the side walls of said body section, said cover section being bendably connected with the rear end of said body section so as to be movable into closed relation to said body section said cover section having a lock tongue at its free end, and said lock tongue having a spur portion, said lock tongue being adapted to be deflected after passing through said slotted lock plate by engagement with said angular wall portion to thereby dispose said lock tongue in hooked relation to said lock plate with said spur portion disposed to brace said lock tongue against displacement from such relation.

5. A seal of unitary form comprising a body section having side walls and a depressed bottom portion including an angular wall portion inclining from the forward end of said body, a slotted lock plate folded over said body from the forward end thereof and spaced above said angular wall section, a cover section having side walls to telescopically cooperate with the side walls of said body section, said cover section being bendably connected with the rear end of said body section so as to be movable into closed relation to said body section, said cover section having a lock tongue at its free end, said lock tongue having a spur portion, said lock tongue being adapted to be deflected after passing through said slotted lock plate by engagement with said angular wall portion to thereby dispose said lock tongue in hooked relation to said lock plate with said spur portion disposed to brace said lock tongue against displacement from such relation, and the side walls of said body section each having at least one opening to disclose the normal contiguity of an adjacent side wall of the closed cover section.

6. A seal of unitary form comprising a hollow body section and a cover section bendable from one end of said body section into closed relation thereto, said cover section having side walls to telescopically fit into said body, a slotted lock plate folded inwardly over said body section from the opposite end thereof, and said cover section having a lock tongue at its free end, said lock tongue having a spur portion to prevent withdrawal of said lock tongue from said slotted lock plate after entrance therethrough.

7. A seal of unitary form comprising a hollow body section and a cover section bendable from one end of said body section into closed relation thereto, said cover section having side walls to telescopically fit into said body, a slotted lock plate folded inwardly over said body section from the opposite end thereof, said cover section having a lock tongue at its free end, said lock tongue having a spur portion to prevent withdrawal of said lock tongue from said slotted lock plate after entrance therethrough, and the sides of said hollow body section each having at least one opening to disclose the normal contiguity of an adjacent side wall of the closed cover section.

8. A seal of unitary form comprising a body section having side walls and a depressed bottom portion including an angular wall portion inclining from the forward end of said body, a slotted lock plate folded over said body from said forward end thereof and spaced above said angular wall section, said lock plate having at its free end a downwardly projected abutment portion footed on the bottom of said body section, the junction of said angular wall portion and said slotted lock plate providing an internal lock socket, a cover section having side walls to telescopically cooperate with the side walls of said body section, said cover section being bendably connected with the rear end of said body section so as to be movable into closed relation to said body section, said cover section having a lock tongue at its free end, and said lock tongue having a spur portion, said lock tongue being adapted to be deflected toward said abutment portion after passing through said slotted lock plate by engagement with said angular wall portion to thereby dispose said lock tongue in hooked relation to said lock plate and said spur portion in opposition to said internal lock socket.

9. A seal as defined in claim 8, wherein the side walls of said body section each having at least one opening to disclose the normal contiguity of an adjacent side wall of the closed cover section.

10. A seal comprising a body section and a cover section movable into closed relation to said body section, a slotted lock plate folded over one end of said body section, said body section having an inclined wall beneath said slotted lock plate, and said cover section having a lock tongue adapted to be deflected after passing through said slotted lock plate by engagement with said inclined wall to thereby dispose said lock tongue in hooked relation to said lock plate.

EMIL DIETZE.